US009371051B2

(12) United States Patent
Shimizu

(10) Patent No.: US 9,371,051 B2
(45) Date of Patent: Jun. 21, 2016

(54) COLLISION DETERMINATION APPARATUS

(71) Applicant: DENSO CORPORATION, Kariya, Aichi-pref. (JP)

(72) Inventor: Ryo Shimizu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 13/785,268

(22) Filed: Mar. 5, 2013

(65) Prior Publication Data
US 2013/0253775 A1 Sep. 26, 2013

(30) Foreign Application Priority Data

Mar. 23, 2012 (JP) ................................. 2012-067247

(51) Int. Cl.
*B60R 21/0136* (2006.01)
*B60R 21/013* (2006.01)
(52) U.S. Cl.
CPC ........... *B60R 21/0136* (2013.01); *B60R 21/013* (2013.01)
(58) Field of Classification Search
None
See application file for complete search history.

(56) References Cited

U.S. PATENT DOCUMENTS

| | | | |
|---|---|---|---|
| 6,720,887 B1* | 4/2004 | Zunti | 340/870.28 |
| 7,359,780 B2* | 4/2008 | Furui | 701/45 |
| 2003/0163287 A1* | 8/2003 | Vock et al. | 702/187 |
| 2006/0052924 A1* | 3/2006 | Prakah-Asante et al. | 701/45 |
| 2006/0113778 A1* | 6/2006 | Seikai | 280/735 |
| 2007/0040672 A1* | 2/2007 | Chinigo | 340/539.22 |
| 2007/0106474 A1* | 5/2007 | Ide | 701/301 |
| 2008/0067794 A1* | 3/2008 | Ide | 280/735 |
| 2008/0269993 A1* | 10/2008 | Simpson et al. | 701/45 |
| 2008/0272579 A1* | 11/2008 | Breed et al. | 280/728.2 |
| 2009/0312949 A1* | 12/2009 | Suzuki et al. | 701/301 |
| 2010/0082180 A1* | 4/2010 | Wright et al. | 701/1 |
| 2010/0324774 A1* | 12/2010 | Bouni et al. | 701/29 |

FOREIGN PATENT DOCUMENTS

| | | |
|---|---|---|
| JP | 2007093408 A | 4/2007 |
| JP | 2008-074127 | 4/2008 |

OTHER PUBLICATIONS

Office Action from corresponding Japanese Application No. JP-2012-067247 issued Feb. 26, 2014.

* cited by examiner

*Primary Examiner* — John R Olszewski
*Assistant Examiner* — Nicholas K Wiltey
(74) *Attorney, Agent, or Firm* — Harness, Dickey & Pierce, P.L.C.

(57) ABSTRACT

A collision determination apparatus receives sensor data, which includes a sensor identifier, from multiple sensors that are of at least two different sensor types. Based on the sensor data from each of the sensors, a main determination unit determines whether to operate a protection apparatus. In parallel, a redundant determination unit determines whether to operate the protection apparatus based on at least one sensor data and by switching sub-determination units that have different determination logics according to a sensor type. In particular, the sensor identifier includes a sensor type information that allows the redundant determination unit to determine the sensor type of the sensor that transmitted the sensor data, and select the appropriate sub-determination unit. Therefore, based on the sensor type information in the sensor data, the same collision determination apparatus can be used in different vehicles that have respectively different number of sensors and different sensor types.

6 Claims, 2 Drawing Sheets

COLLISION DETERMINATION APPARATUS

CROSS REFERENCE TO RELATED APPLICATION

This application is based on and claims the benefit of priority of Japanese Patent Application No. 2012-67247 filed on Mar. 23, 2012, the disclosure of which is incorporated herein by reference.

TECHNICAL FIELD

The present disclosure generally relates to a collision determination apparatus that operates an occupant protection apparatus at a time of a vehicle accident.

BACKGROUND

In Japanese Patent Laid-Open No. 2008-74127 (a patent document 1), an airbag ECU is disclosed as a collision determination apparatus for determining a vehicle collision.

In patent document 1, a main sensor and a safe sensor are described as sensors for providing a collision determination signal. The main sensor is disposed as a G-sensor on a side portion of a vehicle for detecting a right-left direction of acceleration, and the safe sensor is disposed as a G sensor at a center of the vehicle for also detecting the right-left direction of acceleration. The collision determination apparatus uses a redundant circuit system by including a main control circuit and a sub-control circuit. The main control circuit determines a collision based on the output signal from the main sensor and the safe sensor, i.e., the signal from each of G sensors in various positions, and the sub-control circuit determines a collision based on the output signal from the main sensor.

An airbag ECU, which is equipped with a side-collision determination function, may be expected to be capable of performing a collision determination by using various types of sensors. For instance, in a side collision in which the vehicle is impacted by a colliding object on its side, a pressure sensor that detects a steep change of an in-door pressure may be used. Alternatively, an impact sensor that detects an acceleration from an impact of the collision in which the in-door pressure is measured as an air pressure of a space inside of a door may also be used. By having a pressure sensor in an in-door space, the side collision at a door portion can be accurately detected based on the steep change of the air pressure of the in-door space that is caused by a sudden depression of a door outer panel.

However, the airbag ECU of patent document 1 uses a single type of sensor, i.e., the G sensors only. The combined use of various sensor types, such as a combined use of the G sensor and the pressure sensor, is not expected by the airbag ECU.

Further, when different types of sensors are combined, respective determination logics for accommodating the different types of sensors are stored in the integrated circuits, such as an application specific integrated circuit (ASIC). However, one ASIC targeted to one combination of sensors in one vehicle type may not be used for a different combination of sensors, because the ASIC is not rewritable. That is, in a different type of vehicle, a sensor combination may be different, due to the variation of the installation positions and/or the variation of the sensor types. Therefore, one ASIC made for one vehicle type is not compatibly used in other vehicle types. Accordingly, the versatility of the ASIC is very low, and requires a specific ASIC for a specific vehicle type.

SUMMARY

In an aspect of the present disclosure a collision determination apparatus for a vehicle determines whether a vehicle collision has occurred based on information from multiple sensors. The collision determination apparatus includes a bus master, a main determination unit, a redundant determination unit, a logic gate, and a start driver.

The multiple sensors are disposed on the vehicle, and are of at least two different sensor types. Each of the sensors has a predetermined detection function for detecting at least one of a vehicle behavior and a vehicle deformation, and has an identification function for retaining a uniquely-assigned sensor identifier. Further, each of the sensors transmits sensor data, which is a combination of a detection data from the predetermined detection function and the sensor identifier.

The bus master receives the sensor data from each of the sensors through an in-vehicle network, and functions to deliver the sensor data to the main determination unit and to the redundant determination unit.

The main determination unit determines whether to operate an occupant protection apparatus based on the sensor data received from the bus master.

The redundant determination unit determines whether to operate the occupant protection apparatus based on either one of the sensor data forwarded from the bus master. The redundant determination unit performs the determination independently from the main determination unit.

The redundant determination unit has at least two sub-determination units that at least respectively correspond to the different sensor types of the multiple sensors. The redundant determination unit also has a switching unit that selects one of the sub-determination units, which is to be used for the determination of the redundant determination unit (i.e., for a redundant determination).

The logic gate determines whether to operate the occupant protection apparatus after evaluating a determination result of the main determination unit and a determination result of the redundant determination unit. Based on a logic output provided by the logic gate, the start driver starts the occupant protection apparatus.

In the collision determination apparatus of the present disclosure, the bus master receives, through the in-vehicle network, sensor data from multiple sensors. The sensor data not only includes the detection data of each of the sensors, but also includes the sensor identifier. Therefore, the main determination unit, which receives the sensor data from the bus master, is enabled to identify the sensor that sent the sensor data. In addition, the redundant determination unit and the main determination unit are enabled to recognize the sensor type of each of the sensors based on the sensor data.

In other words, the main determination unit distinctively recognizes an origin of the detection data included in the sensor data (i.e., identify from which of the multiple sensors the sensor data was sent from). Accordingly, the main determination unit can perform an appropriate process based on the sensors, thereby more appropriately determining whether or not to operate the occupant protection apparatus.

On the other hand, the redundant determination unit selects one of the sub-determination units to perform a determination based on the sensor identifier in the sensor data. In such a case, the sensor data is at least assigned to one of the sub-determination units according to the sensor type of the sensor that sent the sensor data. Therefore, the redundant determination unit is also enabled to perform an appropriate determination according to the sensor type of the sensors. Further, the determination by the redundant determination unit is performed independently from the determination by the main determination unit.

The determination result by the main determination unit and the determination result by the redundant determination unit are evaluated in the logic gate to perform a determination as to whether or not to operate the occupant protection apparatus, and based on such logic output, the start driver may be operated.

Therefore, by using the sensor data from the sensors, the collision determination apparatus of the present disclosure is enabled to perform an appropriate collision determination. Further, the redundant determination unit is enabled to select an appropriate sub-determination unit that is suitable for the sensor type, which is identified by the sensor identifier, thereby increasing the versatility of the collision determination apparatus in the present disclosure.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

A collision determination apparatus of the present disclosure is described clearly and sufficiently in the following embodiments with reference to the drawings.

(First Embodiment)
(Device Configuration)

Figure 1:
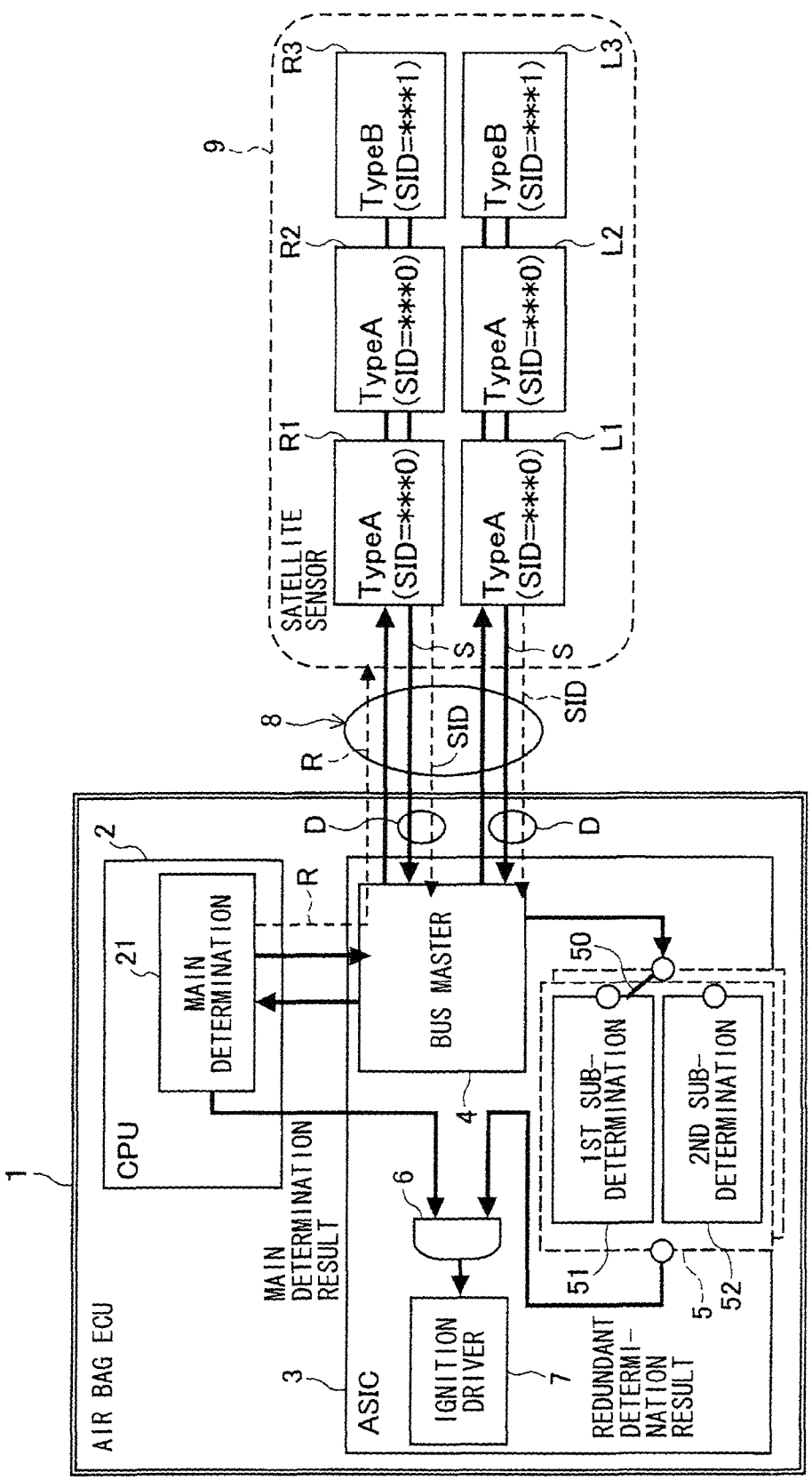
FIG. 1 is a system block diagram including a side collision airbag ECU in a first embodiment of the present disclosure.

With reference to FIG. 1, the collision determination apparatus in the first embodiment includes, an airbag electronic control unit (ECU) 1 that has a side collision determination function for determining whether to operate a side-collision airbag of a vehicle. The airbag ECU 1 (i.e., ECU 1 hereinafter) is connected to satellite sensors 9 installed dispersedly in various parts of the vehicle through an in-vehicle network 8 (i.e., a bus communication according to a DSI standard). The satellite sensors 9 are provided as six sensors of two different types.

The satellite sensors 9 may be disposed on a side surface of the vehicle. For the detection of the in-door space pressure variation and for the detection of impact, the right side of the vehicle has a pressure sensor R1, a pressure sensor R2, and an impact sensor (i.e., an acceleration sensor) R3 respectively installed in a front door, in a rear door, and in a B pillar between the front and the rear door at an appropriate height. In symmetry, on the left side of the vehicle a pressure sensor L1 is installed in the front door, a pressure sensor L2 is installed in the rear door, and an impact sensor L3 is installed in the B pillar.

The sensors R1, R2, L1, L2 are pressure sensors that have a detecting function for detecting deformation of the doors on the vehicle side surfaces, and the sensors R3, L3 are impact sensors that have a detecting function for detecting either deformation of a center pillar (i.e., B pillar) of the vehicle or acceleration caused in a right-left direction.

Each of the sensors R1-R3, L1-L3 is equipped with a unique identifier retain function that retains a unique sensor identifier (i.e., SID) assigned to the respective sensor, and is equipped with a transmission function that transmits to the in-vehicle network 8 a sensor data D that includes a detection data S detected by the detecting function and includes the sensor identifier SID.

The respective sensor identifiers SIDs assigned to the satellite sensors 9 have sensor type information representing the sensor type of each of the sensors R1-R3, L1-L3 (i.e., a pressure sensor or an impact sensor). Specifically, when the last digit of the SID in the sensor data D is "0" (i.e., zero), that indicates that the sensor data D is from a pressure sensor, and when the last digit of the SID in the sensor data D is "1" (i.e., one), the sensor data D is from an impact sensor.

The description of the sensors R1-R3, L1-L3 (i.e., peripheral devices) used by the ECU 1 is now concluded, and the configuration of the ECU 1 itself is now described.

The ECU 1 in the present embodiment includes, in one housing, (i) a CPU 2 having a built-in main determination unit 21 and (ii) an ASIC 3 having, as built-in parts, a bus master 4, a redundant determination unit 5, a logic gate 6, and a ignition driver 7, which serves as a start driver.

The bus master 4 receives the sensor data D from each of the two types of sensors (i.e., pressure sensors R1, R2, L1, L2 and impact sensors R3, L3) through the in-vehicle network 8, and delivers the data D to each of the main determination unit 21 of the CPU 2 and the redundant determination unit 5 of the ASIC 3.

Based on the sensor data D transferred from the bus master 4, the main determination unit 21 determines whether to operate the side-collision airbag (i.e., an occupant protection mechanism).

The main determination unit 21 performs a collision determination by using a determination software program that is executed by the CPU 2.

Therefore, the CPU 2 that is functioning as the main determination unit 21 may not only perform a determination based on the sensor data D from only one of the sensors R1-R3, L1-L3, but may also performs a determination based on a combination of the sensor data D from two or more sensors R1-R3, L1-L3. For example, in a case where detection data S from the pressure sensors R1, R2, L1, L2 do not indicate any steep change of pressure, and the detection data S from the impact sensors R3, L3 indicate acceleration at about the same level within a certain threshold, it may be determined that the collision is not so serious, and does not require an operation of the side-collision airbag.

Figure 2:
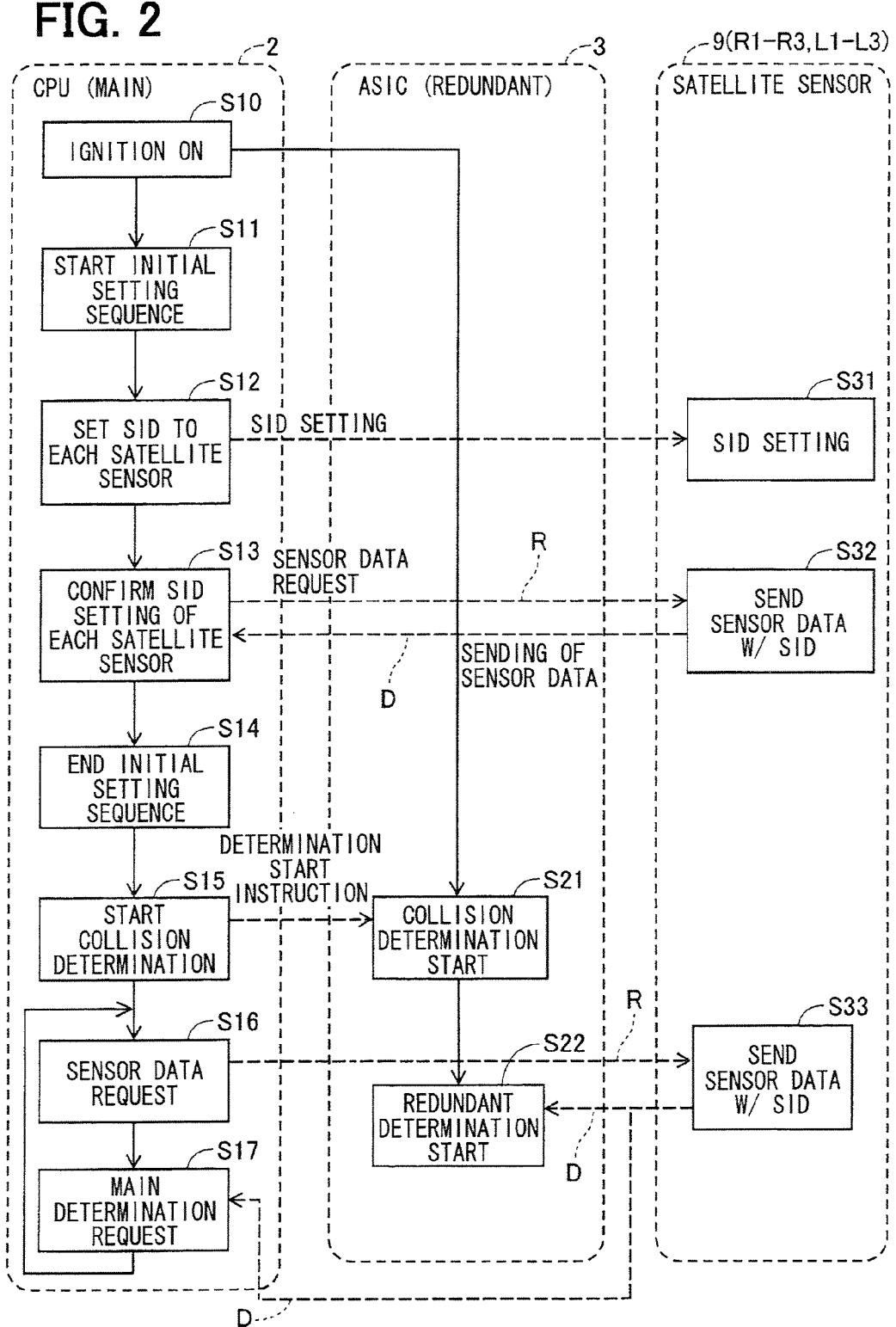
FIG. 2 is a flowchart of an operation sequence and signal exchange.

The main determination unit 21 has an identifier setting unit S12 (see FIG. 2) to initialize the identifier setting at a start up time and an identifier confirmation unit S13 (see FIG. 2). In this case, the identifier setting unit S12 is a component that sets a different sensor identifier SID to each of the sensors R1-R3, L1-L3. The identifier confirmation unit S13 is a component that transmits a request signal R requesting the transmission of the sensor data D to each of the sensors R1-R3, L1-L3 and confirms the sensor identifier SID included in the sensor data D, which is provided by each sensor R1-R3, L1-L3. The details of such signal exchange will be described later with reference to FIG. 2.

The ASIC 3 performs a redundant side-collision determination independently from the determination performed by the main determination unit 21 of the CPU 2.

Specifically, the redundant determination unit 5 determines whether to operate the side-collision airbag based on one of many sensor data D that are transferred from the bus master 4, and such determination is performed independently from the determination by the main determination unit 21. For such a determination, the redundant determination unit 5 includes two sub-determination units 51, 52 and a switch unit 50 that selects one of the two sub-determination units 51, 52 as the determination of the redundant determination unit 5.

The switch unit 50 distinguishes each of the sensor data D, in terms of the type of sensor. In particular, based on the sensor identifier SID in the sensor data D, the switch unit 50 distinguishes from which one of the pressure sensors R1, L1, R2, L2 (i.e., the former) and the impact sensors R3, L3 (i.e., the latter) the data is coming. In case of the former, the detection data S in the sensor data D is sent to the first sub-determination unit 51 for performing a determination, and, in case of the latter, the detection data S in the sensor data D is sent to the second sub-determination unit 52 for performing a determination. The determination logic in the first sub-determination unit 51 is for the side collision determination based on a steep change of the in-door pressure, and the determination logic in the second sub-determination unit 52 is for the side collision determination based on, for example, an impact acceleration caused in the center pillar or a change rate of such acceleration.

Accordingly, the sub-determination units 51, 52 have respectively different determination logics for different sensor types, and the switch unit 50 sends the sensor data D to an appropriate sub-determination unit 51, 52 based on the sensor type of the sensor that sent the sensor data D.

The logic gate 6 is an AND gate 6, and has a function that determines whether to operate the side-collision airbag based on a combined in-total result of (i) the determination from the main determination unit 21 of the CPU 2 and (ii) the determination from both of the sub-determination units 51, 52 of the redundant determination unit 5. According to a logic output of the AND gate 6, the ignition driver 7, which serves as the start driver, operates a gas generator of an airbag that serves as an occupant protection apparatus for side collisions.

(Operation Procedure)

With reference to FIG. 2, based on the above configuration, the airbag ECU 1 serving as the collision determination apparatus of the present embodiment operates in the following manner.

When an ignition switch is turned ON (e.g., when a start switch of a hybrid vehicle or an electric vehicle is turned ON), electric power is supplied to the airbag ECU 1 of the present embodiment.

Once the ignition is turned on, the CPU 2 receive power at 510, and the CPU 2 supplies power to the ASIC 3, and starts an initial setting sequence at S11. When the initial setting sequence is complete, the CPU 2 starts to serve as the main determination unit 21.

The CPU 2 performs an initial setting of the sensors R1-R3, L1-L3, at S12, thereby operating as the identifier setting unit S12. In particular, the CPU 2 transmits a signal to set a respectively different sensor identifier SID to each of the satellite sensors 9 through the in-vehicle network 8. At S31, each of the satellite sensors 9 (i.e., the sensors R1-R3, L1-L3) receives a specified sensor identifier SID and retains the sensor identifier SID.

As described above, the last digit of the sensor identifier SID of the pressure sensors R1, L1, R2, L2, is assigned as "0" (zero), and the last digit of the sensor identifier SID of the impact sensors R3. L3, is assigned as "1" (one). By assigning such sensor identifier SID, the sensor data D transmitted from the satellite sensors 9 (FIG. 1) through the in-vehicle network 8 is identified in regards to which one of the sensors 9 is the source of such sensor data D. as well as, the type of sensor that is the source of such sensor data D (i.e., whether the sensor that transmitted the sensor data D is a pressure sensor or an impact sensor).

At S13, the CPU 2 transmits the signal R to each of the sensors R1-R3, L1-L3 for requesting a transmission of the sensor data D. The request signal R is transmitted to the satellite sensors 9 through the in-vehicle network 8. On the satellite sensor 9 side, each of the sensors R1-R3, L1-L3 returns the sensor data D that includes the detection data S and the sensor identifier SID to the CPU 2 through the in-vehicle network 8 at S32. The CPU 2 then confirms the sensor identifier SID in the sensor data D received at 813. In such manner, the CPU 2 confirms that each of the sensors R1-R3, L1-L3 has its sensor identifier SID assigned thereto and the sensors R1-R3, L1-L3 are working properly without any abnormality based on the detection data S. Thus, the CPU serves as the identifier confirmation unit S13.

If there is an abnormality in any one of the sensor data D from the satellite sensors 9, the CPU 2 determines not to use the sensor data D from the abnormal sensor(s) 9, and warns the driver of the vehicle that such sensor 9 should be examined and repaired without delay. Such functions of (i) monitoring of the sensor data D from each of the sensors 9 and of (ii) providing a warning of a sensor abnormality for warning the driver, are kept working throughout the operation of the CPU 2, which enables the CPU 2 to serve as a main determination unit 21.

The initial setting sequence is now complete, and the CPU 2 recognizes the end of the initial setting sequence at S14. At S15, the CPU 2 sends a determination start instruction for starting an independent collision determination to the redundant determination unit 5 of the ASIC 3.

The CPU 2, which serves as the main determination unit 21, works in a normal operation state, and basically repeats the execution of S16 and S17 at a predetermined sampling rate.

Specifically, at S16, the CPU 2 sends the signal R requesting a reply of the sensor data D to the satellite sensors 9 through the in-vehicle network 8. In response to such a signal R. the sensor data D. which is the detection data S with the sensor identifier SID, is transmitted at S33 from each of the sensors R1 -R3, L1-L3 through the in-vehicle network 8, in the same manner as in 832.

The bus master 4 of the ECU 1 receives the sensor data D, and sends (i.e., forwards) the sensor data D not only to the CPU 2, which is serving as the main determination unit 21, but also to the redundant determination unit 5 in parallel.

At S17, the CPU 2 receives each sensor data D through the bus master 4, and performs a side collision determination based on a predetermined calculation process. The CPU 2 then sends the result of such process to the ASIC (not shown in FIG. 2), in particular, to the AND gate 6 of the ASIC 3.

Since the redundant determination unit 5 of the ASIC 3 has already received the collision determination start instruction at S21, the redundant determination unit 5 receives the sensor data D from the bus master 4 at 822.

The redundant determination unit 5 reads the sensor identifier SID in the sensor data D, and, according to the type of the sensor that has transmitted the sensor data D, controls the switch unit 50, in terms of which one of the sub-determination units 51, 52 should be selectively used to perform the determination based on the sensor data D received.

In other words, at S22, the switch unit 50 of the ASIC 3 delivers the detection data S to an appropriate one of the two sub-determination units 51, 52, according to the sensor type represented by the sensor identifier SID in the sensor data D.

For instance, the detection data S of the sensor data D from one of the pressure sensors R1, L1, R2, L2 is delivered to the first sub-determination unit 51 for a collision determination. On the other hand, the detection data S of the sensor data D from the impact sensor R3, L3 is delivered to the second sub-determination unit 52 for a collision determination.

In such manner, an independent collision determination is respectively performed by both of (i) the CPU 2 serving as the main determination unit 21 and (ii) the ASIC 3 serving as the redundant determination unit 5. The determination results from the CPU 2 and the ASIC 3 are then combined by the AND gate 6 as shown in FIG. 1, and such a combination of the determination results is used for a determination of whether to operate the ignition driver 7.

(Advantageous Effects)

The ECU 1, which serves as the collision determination apparatus of the present embodiment, receives, by using the bus master 4, the sensor data D that are sent through the in-vehicle network 8 from two types of sensors R1-R3, L1-L3. The sensor data D, not only includes the detection data S of each of the sensors R1-R3, L1-L3 but also includes the sensor identifier SID. Further, the sensor identifier SID has information representing the sensor type.

Therefore, by receiving the sensor data D from the bus master 4, the main determination unit 21 can determine from which one of the sensors R1-R3, L1-L3 did the detection data S come from. In addition, the main determination unit 21 and the redundant determination unit 5 are enabled to determine whether the sensor data D is from the pressure sensors R1, L1, R2, L2 or from the impact sensor R3, L3.

The main determination unit 21 is also enabled to determine which one of the sensors R1-R3, L1-L3 transmitted the detection data S in the sensor data O. based on the sensor identifier SID. Accordingly, the main determination unit 21 performs an appropriate process according to the arrangement and type of the sensors R1-R3, L1-L3, thereby enabling an appropriate determination of whether to operate the side collision airbag, which serves as an occupant protection apparatus.

On the other hand, the sensor type of the sensor sending the sensor data D can also be determined by the redundant determination unit 5 based on the sensor identifier SID included in the sensor data D, and such determination enables the switch unit 50 to select an appropriate one of the two sub-determination units 51, 52. Further, the determination by the redundant determination unit 5 is performed independently from the determination by the main determination unit 21.

A determination result by the main determination unit 21 and a determination result by the redundant determination unit 5 are compared by the AND gate 6, and, based on a logical combination output of the two determination results, the ECU 1 determines whether to send an ignition signal to the side-collision airbag.

Therefore, according to the ECU 1, which serves as the collision determination apparatus of the present embodiment, while using the sensor data D from two types of the sensors R1-R3, L1-L3 for performing a collision determination in a more appropriate determination level, the redundancy of the sensor data is still secured as its advantageous effects. Further, even when a modification is made to the collision determination apparatus, such as an increase of the number of the in-vehicle sensors, the hardware of the ECU 1 can be compatibly used as it is without modification, because the type of the added sensor(s) can automatically be determined by the sensor identifier SID.

Specifically, since a determination software program of the CPU 2 that serves as the main determination unit 21 can be easily rewritten, the cost of rewriting the software program is nominal even when such rewriting is required. On the other hand, if the ASIC 3 needs to be remodeled, the design change and a new manufacturing process regarding such remodel may lead to a substantial increase in cost.

In view of the above, the operation scheme of the present embodiment, which allows the use of the ASIC 3 without change and also allows an as-required program change of the CPU 2, enables an easy implementation of the ASIC 3 to a different vehicle, even in case where the implementation is to a different vehicle that has a different number of the sensors or a different arrangement of the sensors. In other words, the ECU 1, which serves as the collision detection apparatus, is very versatile and can be used in various types of vehicles.

Further, since the sensors R1-R3, L1-L3 are disposed in various parts of the vehicle in a dispersed manner as the satellite sensors 9, even a local deformation or a localized behavior of a part of the vehicle can be detected at a time of collision. That is, based on the detection of the steep change of the in-door pressure only in one of the four doors on the right/left/front/rear of the vehicle and/or based on the detection of the large acceleration in the center pillar, the collision determination is performed by the sub-determination units 51, 52 according to the sensor types of the sensors R1-R3, L1-L3.

Therefore, as the advantageous effects of the present embodiment, the collision determination is performed very quickly without waiting for the deformation to spread from one part to another part of the vehicle or without waiting for the impact acceleration to spread in the vehicle. Such effects may be enhanced by having an increased number of sensors on a larger area of the vehicle's side face, and, even in such a case, the ECU 1 of the present embodiment can be used without modifications.

(Various Modifications)

As modifications of the above embodiment, a side collision sensor may be provided additionally in various parts of the vehicle, such as in a vehicle's front part (e.g., in a fender) or in a vehicle's rear part (e.g., on both sides of a trunk), as a sensor for detecting either an acceleration, an impact, or an outer panel deformation, in addition to the pillar-installed sensors. That is, the more dispersedly the satellite sensors 9 are disposed in the vehicle, the quicker the collision detection can be made, without waiting for the deformation or acceleration of the impact to spread in the vehicle.

The operation scheme of the present disclosure may also determine whether the vehicle has been overturned. That is, in a case where the detected accelerations from the impact sensors R3. L3, which are respectively on the right and left side of the vehicle, have substantially the same magnitude in the same direction and if the impact sensors R3. L3 are sufficiently accurate acceleration sensors, the overturn determination of the vehicle can be performed. In addition, if a roll rate sensor (i.e., a roll acceleration sensor) for a sophisticated suspension control is available in the vehicle, the data from such sensor may also be used in combination for performing a more accurate overturn determination.

Further, as an in-vehicle network, various standard networks such as the CAN standard, the CANopen standard, or the Devicenet standard may also be used.

The coverage of the present disclosure is not limited to the above-described embodiment. In other words, the embodiment may also be applicable to a detection of a front collision, a rear collision, a diagonal collision and the like, as well as applicable to an overturn of the vehicle, a rollover of the vehicle, and the like.

(Second Embodiment)

Unlike the first embodiment, the airbag ECU may have the following arrangement of the sensors for the determination of the side collision of the vehicle.

In a second embodiment, on the right side of the vehicle, a pressure sensor is disposed in a front door for detecting a pressure of an in-door space, and an impact sensor (i.e., an acceleration sensor) is disposed at an appropriate height in the B pillar, which is positioned between the front door and the rear door, and another impact sensor (i.e., an acceleration sensor) is disposed at an appropriate height in a C pillar, which is positioned on a rear side of the rear door. On the left side of the vehicle, the pressure sensor and the impact sensors are symmetrically disposed in the front door, and in the B and C pillars.

The ECU in the present embodiment is the same as the ECU 1 in the first embodiment, even when the number and arrangement of the impact sensor and the pressure sensor are changed, because the sensor identifier SIDs of the sensors include information regarding the sensor type.

As the ECU 1 of the present disclosure has a high versatility as described above, the ECU 1 may compatibly be used in various types of vehicles as the collision determination apparatus. As a result, in a mass production of various vehicles, the overall cost decreases and the reliability increases. Also, the quick collision determination feature remains unchanged in the present embodiment, just like the first embodiment.

Further, each of the modifications in the first embodiment may also be realized in the present embodiment.

Although the present disclosure has been fully described in connection with the preferred embodiment thereof with reference to the accompanying drawings, it is to be noted that various changes and modifications will become apparent to those skilled in the art, and such changes and modifications are to be understood as being within the scope of the present disclosure as defined by the appended claims.

INDUSTRIAL APPLICABILITY

The collision determination apparatus of the present disclosure can be applied to various vehicles, i.e., not only to an automobile but also to an airplane, a ship/vessel and the like. The present disclosure is enabled to cover such a variety of claimed subjects by simply replacing a "vehicle" language in claims with a "transportation equipment," a "mobile device" or with a similar language.

What is claimed is:

1. A collision determination apparatus for determining an occurrence of a collision and deploying an occupant protection apparatus, the collision determination apparatus comprising:

multiple sensors being of at least two different sensor types, each of the multiple sensors having a predetermined detection function detecting at least one of a vehicle behavior or a vehicle deformation, the multiple sensors having an identification function for retaining a uniquely-assigned sensor identifier that includes a sensor type information, and each of the multiple sensors transmitting a sensor data;

a bus master receiving the sensor data from each of the multiple sensors via an in-vehicle network, the sensor data including a detection data from the predetermined detection function and the uniquely-assigned sensor identifier;

a main determination unit determining whether to operate the occupant protection apparatus based on the sensor data forwarded by the bus master, in which one of the multiple sensors transmitting the sensor data is identified based on the sensor identifier in the sensor data;

a redundant determination unit including at least two sub-determination units and a switch unit, the sub-determination units being of at least two different types and a number of determination logics, and at least corresponding to respectively different sensor types of the multiple sensors, the switch unit sending the sensor data to an appropriate sub-determination unit for providing a redundant determination based on the sensor type information that is used to detect the at least one of the vehicle behavior or the vehicle deformation in the uniquely-assigned sensor identifier, wherein the redundant determination of whether to operate the occupant protection apparatus is based on at least one of the sensor data forwarded by the bus master and is performed independently by the appropriate sub-determination unit from the determination of the main determination unit;

a logic gate determining whether to operate the occupant protection apparatus by evaluating a determination result of the main determination unit and a determination result of the redundant determination unit; and a start driver starting the occupant protection apparatus according to a logic output provided by the logic gate.

2. The collision determination apparatus of claim 1, wherein the sensors are satellite sensors that are dispersedly disposed on the vehicle, and the sensor type information of the uniquely-assigned sensor identifier represents a sensor type of each of the satellite sensors.

3. The collision determination apparatus of claim 1, wherein the main determination unit further includes:

an identifier setting unit that sets a different uniquely-assigned sensor identifier to each of the multiple sensors as an initial setting after a start up; and an identifier confirmation unit that confirms the different uniquely-assigned sensor identifier in the sensor data that is returned by the multiple sensors in response to a request signal, which requests a transmission of the sensor data and is sent to each of the sensors.

4. The collision determination apparatus of claim 1, wherein the collision determination apparatus is an electronic control unit (ECU) that includes, in one housing:

a CPU including the main determination unit, and an ASIC including the bus master, the redundant determination unit, the logic gate, and the start driver.

5. The collision determination apparatus of claim 4, wherein the ECU is an airbag ECU having a side collision determination function, the different sensor types at least include a pressure sensor that detects a pressure change in an in-door space of each door and are movably installed on a side face of the vehicle and include an impact sensor disposed in a non-movable side face that detects at least one of an acceleration or deformation, the sub-determination units include a first sub-determination unit that performs a collision determination based on the detection data from the pressure sensor and a second sub-determination unit that performs a collision determination based on the detection data from the impact sensor, the logic gate is an AND gate, and the start driver is an ignition driver that operates a gas generator for deploying an airbag that serves as the occupant protection apparatus for a side collision.

6. The collision determination apparatus of claim 1, wherein
the sensor type information of the uniquely-assigned sensor identifier is identical amongst all sensors of a similar type.

* * * * *